Jan. 22, 1957 J. L. HAYNES 2,778,109
CITRUS FRUIT SPOON
Filed July 26, 1956

INVENTOR.
James L. Haynes
BY
ATTORNEY

United States Patent Office 2,778,109
Patented Jan. 22, 1957

2,778,109

CITRUS FRUIT SPOON

James L. Haynes, Kansas City, Mo.

Application July 26, 1956, Serial No. 600,315

5 Claims. (Cl. 30—324)

This invention relates to the field of cutlery, and more particularly to a spoon adapted for use in removing the sections of citrus fruits and conveying the same to the mouth of a person eating the fruit.

The primary object of this invention is to provide a citrus fruit spoon which has a series of marginal serrations therein of suitable configuration to efficiently remove the sections of citrus fruit from such fruit without "squirting" or loss of juices and which may additionally be utilized for conveying such sections to the mouth of a person eating the fruit without danger of cutting the mouth of such person.

An equally important object of this invention is to provide a citrus fruit spoon in which the serrations on the marginal edge thereof consist of a median series of square or rectangular teeth dividing a pair of spaced serrations which have an isosceles trapezoidal configuration whereby the sections of the citrus fruit are readily severed from the fruit and all possibility of injuring the mouth of the person eating the fruit when the spoon is placed in the mouth is effectively precluded.

Also an important object of this invention is the provision of a citrus fruit spoon as above referred to in which cutting surfaces of the spoon are blunt whereby all sharp edges which would tend to cut the mouth of a person using the spoon are removed.

Other important objects of this invention include the way in which the citrus fruit spoon has rectangular teeth dividing V-shaped notches on the marginal edges of the spoon and constructed in such a manner that the width and depth of the square notches is less than the width and depth of the V-shaped notches; a spoon in which the maximum width of the V-shaped notches is greater than the width of the trapezoidal teeth; and further, a spoon in which the width of the ends of the rectangular teeth is greater than the width of the square notches forming such teeth, all of such objects being for the purpose of presenting an improved type of citrus fruit spoon which more readily severs the sections from the fruit while at the same time being harmless to a person using the spoon.

Other objects and details of construction will appear or become obvious as the following specification progresses.

Figure 1:
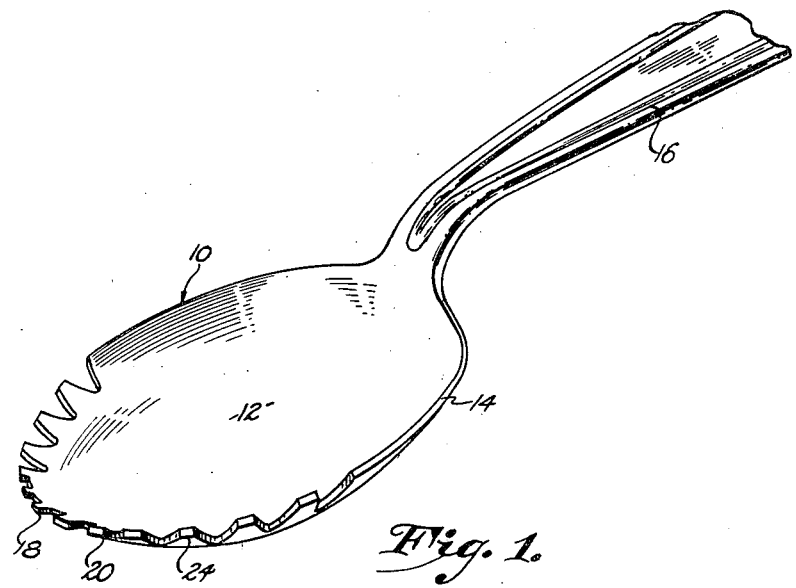
Figure 1 is a fragmentary, perspective view illustrating a citrus fruit spoon embodying the concepts of the instant invention.
Figure 3:
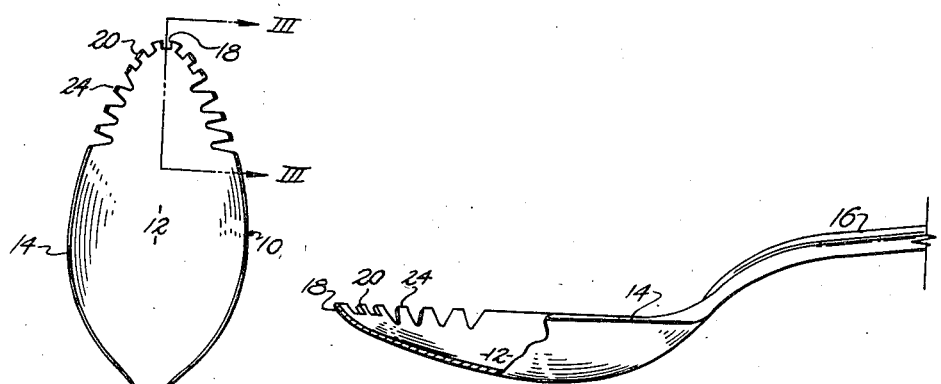
Fig. 3 is a longitudinal, cross-sectional view taken on line III—III of Fig. 2.

A citrus fruit spoon as contemplated by the present invention is shown perspectively in Fig. 1 of the drawing and designated broadly by the numeral 10. Spoon 10 is preferably slightly narrower than teaspoon size and includes a concavo-convex bowl 12 having an oval edge 14 with an elongated handle 16 integrally attached thereto at one end thereof and a series of marginal serrations broadly numbered 18 in the edge 14 at the end opposite to handle 16.

Serrations 18 preferably comprise a median series of identical rectangular teeth 20 formed by a series of square notches 22 cut out of the marginal edge 14.

Figure 4:
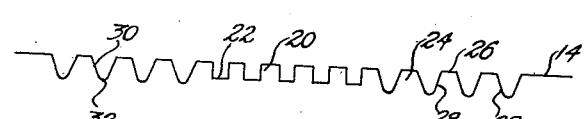
Fig. 4 is a schematic planar representation of the serrations cut in the marginal edge of the spoon as shown in Figs. 1 to 3 inclusive.
Figure 2:
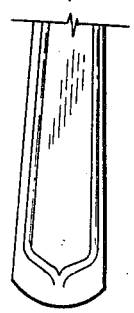
Fig. 2 is a fragmentary, reduced top plan view of the citrus fruit spoon.

Teeth 20 divide a pair of series of identical teeth 24 which are formed in the marginal edge 14 of spoon 10 and extend from the ends of the series of teeth 20 toward the handle 16. As is clearly apparent in Fig. 4 of the drawing wherein there is illustrated a schematic planar representation of the serrations on marginal edge 14, teeth 24 are isosceles trapezoidal in configuration and thus have an uppermost flat portion 26 and a pair of sides 28 which are equal in length. Teeth 24 may be conveniently formed by cutting out of substantially V-shaped notches 30 in the marginal edge 14 of spoon 10 and in this respect, it is to be noted that the V-shaped notches have self-cleaning concave apexes 32, same being arcuately concave rather than pointed to eliminate any tendency for the accumulation of fruit fibers and the like.

Although the number of teeth 20 and 24 can be varied, it is desirable that there be provided four V-shaped cuts 30 on each side of the square teeth 20 to form the trapezoidal teeth 24 and that there be five square cuts 22 which form the rectangular teeth 20. It is also significant that the teeth 20, notches 22, teeth 24 and notches 30 be so dimensioned and used in such numbers that same extend only approximately one-third of the distance from the tip of the bowl 12 to the handle 16. With the extent of serrations thus limited, contact thereof with the lips of a user during withdrawal of the spoon when his mouth is substantially closed will be avoided.

It can be readily perceived that by virtue of the provision of rectangular teeth 20 and trapezoidal teeth 26, that the outermost edges of such teeth are blunt and thereby present no sharp edges which will cut the mouth of the user of the spoon.

In order to increase the efficiency of the spoon in cutting sections from various citrus fruits, it has been found that it is desirable that the square cuts 22 be two-thirds as deep as the V-cuts 30. By the same token, the V-cuts 30 should be twice as wide at the opening thereof as the width of square cuts 22.

It is of further importance that the width of the outermost end 26 of each trapezoidal tooth 26 be substantially two-thirds as great as the distance across the opening of V-shaped notches 30, and also that the width of the square notches 22 be two-thirds as wide as the opening of V-shaped cuts 30. It can now be recognized that the outermost edges of trapezoidal teeth 24 and rectangular teeth 20 are substantially equal in length.

In order to further increase the efficiency of spoon 10, it is desirable that V-shaped cuts 30 be deeper than square notches 22 so that greater cutting action may be obtained from trapezoidal teeth 24 but yet maximum cutting effect is retained in the rectangular teeth 20 for certain operations requiring digging action with the tip of the spoon.

It can now be appreciated that there is presented herein a novel citrus fruit spoon which will perform the desired function of quickly and easily removing sections from citrus fruits while at the same time being usable by the person eating such fruit to convey the sections to his mouth without any danger whatsoever of the serrated edge cutting his mouth, thus eliminating the need for two implements as has heretofore been necessary.

Having thus described the invention what is claimed as new and desired to be secured by Letters Patent is:

1. In a citrus fruit spoon, a concavo-convex bowl having an oval edge and provided with a number of series of marginal serrations extending inwardly from said edge, there being a median series of identical serrations at one end of the bowl and a pair of side series of identical serrations extending from said median series of serrations toward the opposite end of the bowl, the serrations of each series consisting of a plurality of spaced-apart teeth having blunt terminal ends and edges, the teeth forming the serrations of the median series being rectangular, the teeth forming the serrations of the side series having an isosceles trapezoidal configuration.

2. In a citrus fruit spoon, a concavo-convex bowl having an oval edge and provided with a number of series of marginal serrations extending inwardly from said edge, there being a median series of identical serrations at one end of the bowl and a pair of side series of identical serrations extending from said median series of serrations toward the opposite end of the bowl, the serrations of each series consisting of a plurality of spaced-apart teeth having blunt terminal ends and edges, the teeth forming the serrations of the median series being rectangular, the teeth forming the serrations of the side series having an isosceles trapezoidal configuration, said bowl having a number of square notches setting off the rectangular teeth and a number of V-shaped notches setting off the trapezoidal teeth, said V-shaped notches having concave apexes.

3. In a citrus fruit spoon, a concavo-convex bowl having an oval edge and provided with a number of series of marginal serrations extending inwardly from said edge, there being a median series of identical serrations at one end of the bowl and a pair of side series of identical serrations extending from said median series of serrations toward the opposite end of the bowl, the serrations of each series consisting of a plurality of spaced-apart teeth having blunt terminal ends and edges, the teeth forming the serrations of the median series being rectangular, the teeth forming the serrations of the side series having an isosceles trapezoidal configuration, said bowl having a number of square notches setting off the rectangular teeth and a number of V-shaped notches setting off the trapezoidal teeth, said V-shaped notches having concave apexes, the width and depth of the square being less than the width and depth of the V-shaped notches.

4. In a citrus fruit spoon, a concavo-convex bowl having an oval edge and provided with a number of series of marginal serrations extending inwardly from said edge, there being a median series of identical serrations at one end of the bowl and a pair of side series of identical serrations extending from said median series of serrations toward the opposite end of the bowl, the serrations of each series consisting of a plurality of spaced-apart teeth having blunt terminal ends and edges, the teeth forming the serrations of the median series being rectangular, the teeth forming the serrations of the side series having an isosceles trapezoidal configuration, said bowl having a number of square notches setting off the rectangular teeth and a number of V-shaped notches setting off the trapezoidal teeth, said V-shaped notches having concave apexes, the width and depth of the square being less than the width and depth of the V-shaped notches, the maximum width of the V-shaped notches being greater than the width of said terminal ends of the trapezoidal teeth.

5. In a citrus fruit spoon, a concavo-convex bowl having an oval edge and provided with a number of series of marginal serrations extending inwardly from said edge, there being a median series of identical serrations at one end of the bowl and a pair of side series of identical serrations extending from said median series of serrations toward the opposite end of the bowl, the serrations of each series consisting of a plurality of spaced-apart teeth having blunt terminal ends and edges, the teeth forming the serrations of the median series being rectangular, the teeth forming the serrations of the side series having an isosceles trapezoidal configuration, said bowl having a number of square notches setting off the rectangular teeth and a number of V-shaped notches setting off the trapezoidal teeth, said V-shaped notches having concave apexes, the width and depth of the square notches being less than the width and depth of the V-shaped notches, the maximum width of the V-shaped notches being greater than the width of said terminal ends of the trapezoidal teeth, the width of said terminal ends of the rectangular teeth being greater than said width of the square notches.

No references cited.